July 12, 1966  JEAN-CLAUDE LECLERE ETAL  3,259,998
DEVICE FOR THE FLUIDIZATION OF POWDERED MATERIALS
Filed Aug. 7, 1963  2 Sheets-Sheet 1

3,259,998
DEVICE FOR THE FLUIDIZATION OF POWDERED MATERIALS

Jean-Claude Leclere, Saint Germain-en-Laye, and Jean Rouanet, Metz, France, assignors to Institut de Recherches de la Siderurgie Francaise, Saint Germain-en-Laye, France, a professional institution of France
Filed Aug. 7, 1963, Ser. No. 300,517
Claims priority, application France, Aug. 17, 1962, 907,139, Patent 1,338,537; Dec. 1, 1962, 917,269, Patent 82,698
8 Claims. (Cl. 34—57)

The present invention relates to a device for the fluidization of powdered materials.

Many devices are already known which make use of a stream of gas for the purpose of fluidizing powdered materials in the interior of a tank from which said materials are intended to be delivered in constant concentration in a gas. Among the most effective devices can be cited those which consist of a porous base, for example of sintered material or even of woven fabrics, or even of sheet metal pierced with a large number of small and well calibrated holes.

The main object of the present invention is to build a simple fluidization device of this type, the construction, positioning and maintenance of which can easily be effected at little cost, and which makes it possible to provide a remedy for certain disturbances which occur when a distributor tank is filled with very fine or moist powdered materials which adhere to the walls and form hanging arches or caked deposits above the bottom and above the fluidization device.

To this end, the invention contemplates a device for the fluidization of powdered or granular materials in a distributor tank which is provided with at least one outlet orifice for the said powdered materials or granular materials, said device being provided in the interior of the distributor tank with a plurality of porous tubes and at least one compressed-gas distribution pipe to which the said porous tubes are connected.

According to another feature with which the device referred to above may also be endowed a number of outlets for the discharge of powdered materials are set at intervals in the tank bottom and the porous tubes are so arranged that each outlet is located between two porous tubes.

According to another feature of the device at least one of said tubes may be applied against the non-horizontal walls of the tank up to a height which is substantially equal to that of said tank while the porosity which is distributed lengthwise of said tube is oriented towards the interior of said tank. At least three tubes may be applied against the non-horizontal walls of the tank and their center lines may be located in vertical planes which divide the periphery of said tank into equal parts.

Porous tubes which are connected to at least one pipe of the supply of compressed gas may be disposed inside the tank above any obstacles such as apparatuses or pillars on which said apparatuses are supported and which are liable to interfere with the flow of the materials and to result in the formation of hanging arches.

By "porous tubes" there is meant in this context and throughout the following description tubes having walls through which are formed a large number of small openings. It is well known to obtain tubes of this type by sintering of metals, for example. But it would not constitute a departure from the scope of the present invention to employ ordinary tubes, the walls of which can either be pierced by mechanical means or the like with small holes which have the desired orientation and the number of which is adapted to the purpose considered, or else can be fitted with calibrated nozzles, for example. Said porous tubes may have a porous portion and a non-porous portion, each element of tube along the length showing a porous portion and a non-porous portion.

In order that a better understanding of the invention may be obtained, there will be described below two examples of practical application which are given solely by example and not in any sense by way of limitation, reference being made to the accompanying drawings, in which.

Figure 1:
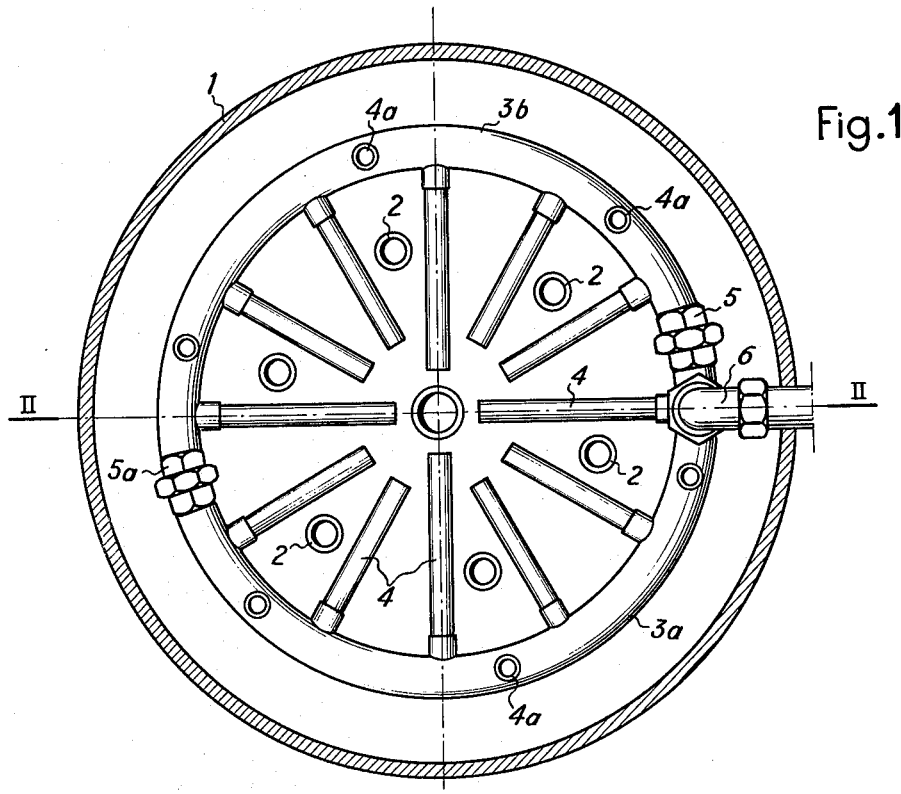
FIG. 1 is a cross-section taken along the line I—I of FIG. 2 showing the bottom of a distributor tank for injecting pulverized coal which is fitted with a fluidization device in accordance with the invention.
Figure 2:
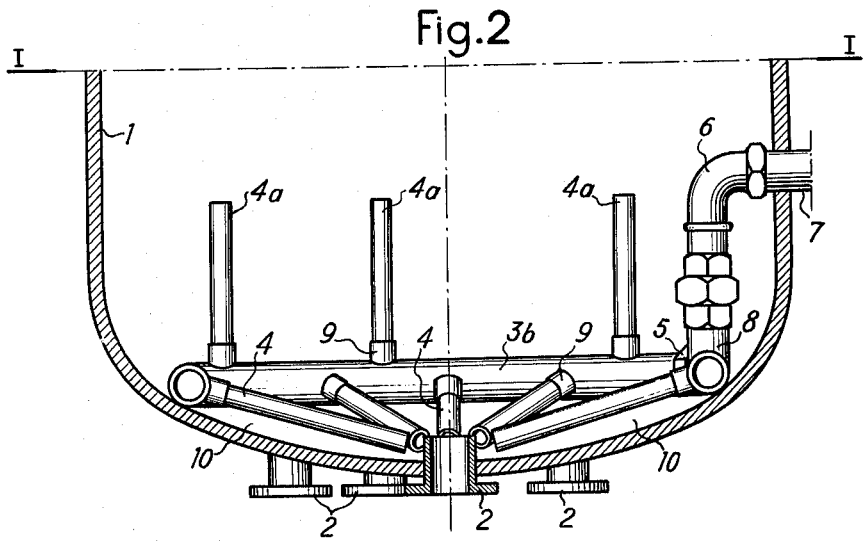
FIG. 2 is a cross-section taken along the line II—II of FIG. 1.

The first example will be described with reference to FIGS. 1 and 2, in which is shown the bottom portion of a pressurized tank 1, the bottom of which is provided with seven outlets 2 for the fluidized materials. The fluidization device as constructed in accordance with the invention comprises a circular conduit for the distribution of compressed air which is formed of tubular circle segments 3a, 3b, and of eighteen porous tubes 4, 4a of sintered bronze which are connected to the circular conduit. The tubular segments 3a and 3b are assembled together by means of threaded union nuts 5 and 5a. The device is supplied with compressed air through the intermediary of an elbow union 6 which couples the compressed-air supply conduit 7 to the vertical connecting-piece 8 which is welded after the fashion of a T-union to the segment 3a of the circular distribution conduit.

Threaded bushings 9 provide a coupling between the compressed-air ring 3a, 3b and each of the porous tubes 4, 4a. The said porous tubes are upon only at one end thereof, namely that end at which said tubes are connected to the conduit 3a, 3b. The porous tubes 4 are substantially parallel to the bottom of the tank and the tubes 4a are vertical. The said porous tubes are uniformly spaced apart in order that the streams of fluidization air are identical in the vicinity of each outlet 2 of fluidized materials, thereby making it possible to have an equal concentration of materials in the vicinity of each outlet.

Pitch is poured at 10 into the bottom of the tank over an area and with a thickness such that each tube 4 is embedded therein over its full length and to a depth corresponding to the lower half of its cylindrical surface. The porous tubes are thus prevented from working under bending stress, while the device is consequently endowed with greater mechanical strength. Moreover, the above arrangement eliminates any possibility of accumulation of powdered products beneath the porous tubes and finally prevents the production of downflowing air streams which would serve no purpose beneath the level of the openings 2 through which the fluidized materials are discharged.

It will be understood that pitch is not the only material which can be employed for this purpose. Any material which can be poured and which is capable of hardening under the conditions of utilization can be considered. There can be mentioned by way of example such materials as tar, cement, easily melted materials whether metallic or not, thermo-plastic or thermosetting polymerizable substances, etc.

As will be apparent, a device of this type can be readily mounted in a tank of any type and subsequently makes it possible both easily and rapidly to provide the fluidized products with additional outlets.

Finally, the maintenance and replacement of the elements are extremely simple and rapid, which is an appreciable feature in industrial plants when, for example, fragments of materials which are not in a powdered or finely divided state penetrate inside the tank and eventually cause damage to the fluidization device or when caked deposits of powder finally obstruct the pores over a part of its surface.

A tank which was equipped in the manner which has been described in the foregoing and the bottom of which was provided with 14 outlets was successfully employed for the purpose of carrying out injections of pulverized coal through the blast tuyeres of a blast furnace, each tuyere being fed from one of said outlets.

The second example relates to a steelmaking powder-distributor which is employed for the purpose of injecting into a metallurgical vessel such as a converter, for example, very fine dusts of iron oxide derived from the de-dusting of gases which pass out of converters supplied with a pure oxygen blast.

Figure 3:
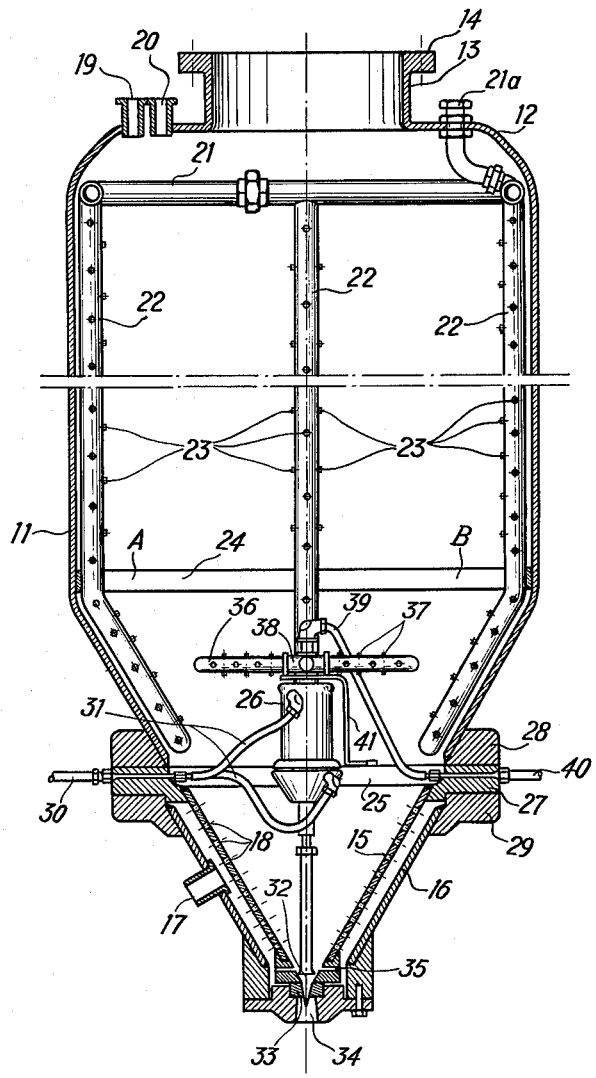
FIG. 3 is a diagrammatic view in vertical cross-section of a converter-dust distributor tank which is fitted with a conical fluidization bottom and a complementary fluidization device in accordance with the invention for the purpose of forestalling hanging and the formation of bridges.

If reference is now made to FIG. 3, it can be seen that the tank as illustrated essentially comprises a cylindrical element 11 which terminates at the top in a stamped end-portion 12 surmounted by a neck 13 provided with a flange 14. The neck forms an opening which can be sealed off by means of a device which has not been shown in the drawings and through which are charged the powdered materials. The cylindrical element is extended at the bottom portion thereof by a frusto-conical double-bottom 15, 16 which permits the fluidization of the materials by means of a stream of compressed gas which is fed in at 17 and divided into fine jets by a plurality of openings 18 which are formed in the inner wall.

There have been shown at 19 and 20, at the summit of the tank, passageways through which purges and injections of compressed gas are effected in order to maintain the pressure inside the tank at a constant value by means of regulating devices of known type which have not been shown in the drawings. Not far from the summit, there has been disposed at 21 a compressed gas supply conduit which is connected to a union 21a outside the tank for the purpose of supplying four "porous" tubes 22. In this example, the four tubes 22 are applied against the vertical wall of the tank and even against a portion of the frusto-conical bottom over a height which is substantially equal to that of the tank. The center lines of these tubes are located in vertical planes which divide the periphery of the tank into four equal segments. The tubes are closed at the bottom end thereof and are fitted with a plurality of nozzles 23 each 0.3 millimeter in diameter. The said nozzles are disposed on each tube along three generator-lines located at an angular distance of 90° relatively to each other, in such manner as to ensure that the jets of gas which pass out of said nozzles are directed in a proportion of one-third towards the center line of the tank while the remaining jets are directed almost tangentially to the wall or at least along an incident line which is very close thereto. The rigidity of the assembly of tubes 21, 22 is ensured by means of a circular metallic ring 24 which is divided into four segments such as the segment A and the segment B which are placed inside the tank between the tubes 22.

There can be seen in FIG. 3 a support 25 which is located near the base of the tank and partly above the double-bottom 15, 16, and on which is fixed in known manner a jack 26. The said support is made up of three arms which are held inside a ring 27 which is clamped between the flanges 28 and 29 of the two main elements constituting the tank. The supply of compressed air to the jack is effected through pipes 30, 31 formed through the ring. The jack 26 actuates a needle-valve 32 which is applied against a seating 33 for the purpose of opening or closing the opening 34 which provides an outlet from the tank. Passages 35 above the seating 33 ensure a continuous scavenging of the discharge opening.

Horizontal tubes 36 which are connected in star formation are mounted above the obstacle which is constituted by the jack. In the example considered, the said horizontal tubes are four in number and arranged in cruciform pattern. Each tube is fitted with nozzles 37 which are each 0.3 millimeter in diameter and which are set at regular intervals along four generator-lines. The tubes 36 are connected to a central cruciform union 38 which is in turn connected at the top portion thereof to a flexible pipe 39 which supplies the compressed gas. This pipe is connected to a pipe 40 formed through the ring 27. The tubes 36 are supported by the union 38 which is in turn secured to the support 25 by means of another support 41.

When the tank is filled with powdered products, the gas jets which pass out of the nozzles 23 have the effect of breaking up any incipient bridges which would otherwise be liable to form and of preventing the formation of substantial caked deposits in the vicinity of the walls. The powdered materials can then flow freely towards the bottom zone of the tank in which the air streams coming from the nozzles 37 and from the fluidization bottom create vortices by virtue of which the caked deposits of smallest size are broken up and the constituents thereof are dispersed with the result that there is provided at the opening 34 a uniform flow of fluidized products.

Making use of a powder distributor equipped as described in the present example, it has been possible to fluidize and to distribute evenly very fine iron oxide dusts having a moisture content up to nearly 2% by weight which, in a tank of the usual type, result in the formation of bridges and caked deposits which act as an obstacle to uniform flow and finally even stop the flow completely.

It will naturally be understood that the descriptions which have just been given constitute only examples of practical application of the invention which are not intended in any limiting sense, and that it would be possible to consider many improvements or detail modifications as well as the use of equivalent means without thereby departing either from the scope or the spirit of the present invention.

What is claimed is:

1. A device for the fluidization of pulverulent material, comprising, in combination, an upright vessel having a bottom wall formed with at least one outlet opening therein the latter directly communicating with the interior of said vessel, and including a peripheral wall extending upwardly from the peripheral portion of said bottom wall; a plurality of tubes located adjacent said bottom wall and extending in substantially radial direction from a peripheral zone of said vessel towards the center thereof, said tubes having top faces directed upwardly away from said bottom wall and being formed with substantially upwardly directed apertures; and compressed gas distributing means operatively connected to said tubes, respectively, for introducing compressed gas into the same.

2. A device for the fluidization of pulverulent material, as defined in claim 1, wherein said tubes are substantially evenly spaced from each other.

3. A device for the fluidization of pulverulent material, as defined in claim 2, and including a plurality of outlet openings in said bottom wall, each of said outlet openings being located between two adjacent ones of said plurality of tubes.

4. A device for the fluidization of pulverulent material, as defined in claim 1, wherein said compressed gas introducing means include a gas introducing conduit communicating with said tubes respectively.

5. A device for the fluidization of pulverulent material, as defined in claim 4, and including gas permeable tubes extending upwardly from said gas introducing conduit and communicating with the same.

6. A device for the fluidization of pulverulent material, as defined in claim 4, wherein said gas introducing conduit communicates with said tubes, respectively, in said peripheral zone of said vessel.

7. A device for the fluidization of pulveruent material, as defined in claim 1, and including a layer of packing material located adjacent to and contacting said bottom wall, without closing said at least one outlet opening therein, said layer of packing material covering the wall portions of said tubes facing towards said bottom wall.

8. A device for the fluidization of pulverulent material as defined in claim 1, wherein said tubes of said plurality of tubes are substantially evenly spaced from each other; including a plurality of outlet openings in said bottom wall, each of said outlet openings being located between adjacent ones of said plurality of tubes; said gas introducing means including an annular, substantially horizontal gas introducing conduit communicating with said tubes, respectively, of said plurality of tubes in said peripheral zone of said vessel; said device also including gas permeable tubes extending upwardly from and communicating with said annular gas introducing conduit; and a layer of packing material located adjacent to and covering said bottom wall of said vessel without closing said outlet openings therein, said layer of packing material covering the wall portions of the tubes of said plurality of tubes facing towards said bottom wall.

References Cited by the Examiner

UNITED STATES PATENTS

| 253,802 | 2/1882 | Wise | 34—57 |
| 2,539,415 | 1/1951 | Garbo | 23—288.3 X |
| 2,639,973 | 5/1953 | Fritz | 34—57 |
| 2,712,361 | 7/1955 | Lindsay | 34—57 |

FOREIGN PATENTS

| 588,361 | 7/1955 | Great Britain. |

JOHN J. CAMBY, *Acting Primary Examiner.*